(12) United States Patent
Marker et al.

(10) Patent No.: US 11,044,890 B2
(45) Date of Patent: Jun. 29, 2021

(54) ADJUSTABLE ANIMAL FEEDER

(71) Applicants: Jared Marker, Greenville, OH (US); Alicia Marker, Greenville, OH (US)

(72) Inventors: Jared Marker, Greenville, OH (US); Alicia Marker, Greenville, OH (US)

( * ) Notice: Subject to any disclaimer, the term of this patent is extended or adjusted under 35 U.S.C. 154(b) by 490 days.

(21) Appl. No.: 15/998,772

(22) Filed: Aug. 16, 2018

(65) Prior Publication Data
US 2020/0053980 A1    Feb. 20, 2020

(51) Int. Cl.
*A01K 5/01* (2006.01)
*F16M 11/04* (2006.01)

(52) U.S. Cl.
CPC .............. *A01K 5/01* (2013.01); *F16M 11/046* (2013.01); *F16M 2200/027* (2013.01)

(58) Field of Classification Search
CPC ........ A47B 9/02; F16M 11/046; F16M 11/18; F16M 2200/047; F16M 2200/027; A01K 5/01; A01K 5/0114; A01K 5/0142
USPC .................. 119/61.1, 61.5, 51.01, 58, 61.56; 211/59.3; 312/71, 306
See application file for complete search history.

(56) References Cited

U.S. PATENT DOCUMENTS

| | | | | |
|---|---|---|---|---|
| 2,444,776 A | * | 7/1948 | Kalning | B65G 1/07 211/28 |
| 2,932,403 A | * | 4/1960 | Vershbow | B65G 1/07 211/59.3 |
| 2,988,048 A | | 6/1961 | Zimmerman | |
| 3,606,021 A | * | 9/1971 | Roels | B65G 1/07 211/49.1 |
| 4,070,072 A | * | 1/1978 | Skaller | B65G 1/07 108/136 |
| 4,173,948 A | | 11/1979 | Austin | |
| 4,976,223 A | * | 12/1990 | Pierce | A01K 5/0114 119/61.56 |
| 5,054,431 A | * | 10/1991 | Coviello | A01K 5/0114 119/61.56 |
| 6,062,148 A | * | 5/2000 | Hodge | A47B 9/02 108/147 |
| 6,450,360 B1 | * | 9/2002 | Hyde | B65G 1/07 108/136 |
| 7,624,974 B2 | | 12/2009 | Zheng | |
| 7,658,153 B1 | * | 2/2010 | Patoka | B60R 11/00 108/44 |
| D682,483 S | | 5/2013 | Silverman | |
| 8,776,725 B1 | | 7/2014 | Grijalva | |
| 9,144,225 B1 | * | 9/2015 | Gaccione | A01K 5/0114 |
| D800,396 S | * | 10/2017 | Coviello | D30/133 |
| 10,149,456 B2 | * | 12/2018 | Diamond | A01K 5/0114 |

(Continued)

*Primary Examiner* — Yvonne R Abbott-Lewis
(74) *Attorney, Agent, or Firm* — Stockwell & Smedley, PSC

(57) ABSTRACT

A height adjustability mechanism including a height adjustability mechanism including a spring-biased first lever including a first lever body comprising a first rod hole including a first hole perimeter face pivotally engaged with a guide rail extending through the first rod hole, a spring-biased second lever including a second lever body including a second rod hole including a second hole perimeter face pivotally engaged with the guide rail extending through the second rod hole, wherein the spring bias of the first lever frictionally engages the first hole perimeter face against the guide rail, and wherein the spring bias of the second lever frictionally engages the second hole perimeter face against the guide rail.

10 Claims, 12 Drawing Sheets

(56) References Cited

U.S. PATENT DOCUMENTS

| | | | |
|---|---|---|---|
| 10,412,929 B2* | 9/2019 | Kasper | A01K 7/005 |
| 10,524,451 B1* | 1/2020 | Sciortino | A01K 5/0135 |
| 10,548,294 B1* | 2/2020 | Price | F16M 11/2092 |
| 2010/0180825 A1* | 7/2010 | Kleinsasser | A01K 5/0225 |
| | | | 119/53 |
| 2014/0117197 A1* | 5/2014 | Stover | F16M 11/18 |
| | | | 248/558 |
| 2016/0278514 A1* | 9/2016 | Maas | A47B 9/18 |

* cited by examiner

ADJUSTABLE ANIMAL FEEDER

FIELD OF THE INVENTION

The present invention relates generally to adjustable animal feeders, and more specifically, a feeding accessory for raising and/or lowering the elevation of feeding and/or watering bowls.

BACKGROUND

Producing a champion show animal, such as a show pig, requires a lot of hard work, careful selection, a good home and feeding program, and effective fitting and showing. Feeding and exercise programs can affect muscle structure, an important factor in show animals. For example, the most desirable muscle structure for show pigs may be thick and loose, rather than tight, round, or bunched muscling. Furthermore, judges may look for prominence of the forearm and width and depth of the ham.

SUMMARY

Embodiments of the present invention relate to a height adjustability mechanism including a height adjustability mechanism including a spring-biased first lever including a first lever body comprising a first rod hole including a first hole perimeter face pivotally engaged with a guide rail extending through the first rod hole, a spring-biased second lever including a second lever body including a second rod hole including a second hole perimeter face pivotally engaged with the guide rail extending through the second rod hole, wherein the spring bias of the first lever frictionally engages the first hole perimeter face against the guide rail, and wherein the spring bias of the second lever frictionally engages the second hole perimeter face against the guide rail.

Additional aspects of the invention relate to an animal feeder including a feeder trough connected with a base plate that is connected with a height adjustability mechanism, wherein the height adjustability mechanism further includes a housing pivotally engaged with a first lever and a second lever, the first lever including a first lever body including a first rod hole including a first hole perimeter face pivotally engaged with a guide rail extending through the first rod hole, the second lever including a second lever body including a second rod hole including a second hole perimeter face pivotally engaged with the guide rail extending through the second rod hole, a spring connected with the first lever and the second lever, wherein the spring biases the first lever such that the first hole perimeter face frictionally engages the guide rail; and wherein the spring biases the second lever such that the second hole perimeter face frictionally engages the guide rail.

Additional aspects of the invention relate to a method of feeding an animal including setting a height of a feeder bowl to an appropriate height for a show animal including pushing a spring-biased lever of a height adjuster against the spring bias, moving the height adjuster along a guide rail of the frame, and releasing the spring-biased lever at the appropriate height.

BRIEF DESCRIPTION OF THE DRAWINGS

Various aspects of the present invention are illustrated by way of example, and not by way of limitation, in the accompanying drawings.

FIG. 10a depicts a side view of the animal feeder of FIG. 1 attached to an emplacement and the feeder bowl adjusted to an appropriate height for a feeding animal in accordance with the principles of the present invention.

DETAILED DESCRIPTION OF THE PREFERRED EMBODIMENTS

Figure 1:
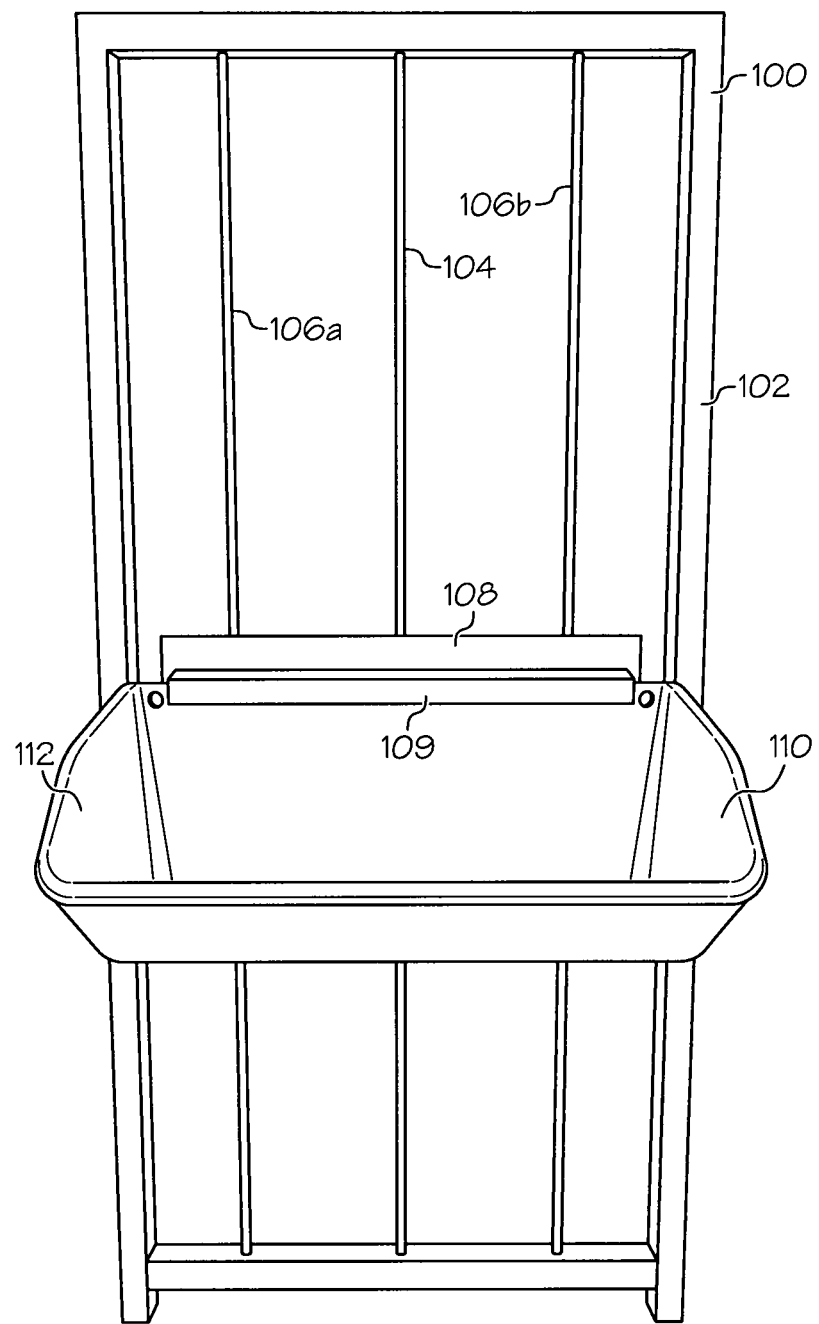
FIG. 1 depicts a diagram of an animal feeder in accordance with the principles of the present invention.

The present invention relates generally to adjustable animal feeders, and more specifically, a feeding accessory for raising and/or lowering the elevation of feeding and/or watering bowls.

Producing a champion show animal, such as a show pig, requires a lot of hard work, careful selection, a good home and feeding program, and effective fitting and showing. Feeding and exercise programs can affect muscle structure, an important factor in show animals. For example, the most desirable muscle structure for show pigs may be thick and loose, rather than tight, round, or bunched muscling. Furthermore, judges may look for prominence of the forearm and width and depth of the ham.

Animal showers may select pigs for extra length of rump, squareness and thickness of rump, and depth from the tail to the base of the ham. However, muscle structure may be further developed and/or maintained. Embodiments of the present invention may help develop and/or maintain muscle structure in show animals by providing a structure for raising feed and/or watering bowls such that the show animals must use its muscle to raise up to the food and/or water. However, animals may grow taller with age, and therefore the feed and/or watering bowls may be raised proportionately to force the show animal to continue to exert physical effort for feeding.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the description herein, "hingeably" and similar variations refer to rotation about a point as if on a hinge relative to the reference structure. Thus, any structure sufficient for hingeable relationship may be used, unless a specific structure is explicitly stated as being required.

In the description herein, "rotatably" and similar variations refer to rotation about a point as if on an axle relative to the reference structure. Thus, any structure sufficient for a rotatable relationship may be used, unless a specific structure is explicitly stated as being required.

In the description herein, "pivotably" and similar variations refer to a rotatable, hingeable, or other pivotable attachment relative to the reference structure.

As used herein, "proximate" means the referenced structure is closer than any other structure, when proximate is used in absolute referenced (alternatively, "proximate" can be used relatively between multiple structures). For example, if an anchor is "proximate" the bottom of a shank, the anchor is closer to the bottom than any other structure of the shank or any other structure touching the shank.

As used herein, "near" means within ⅓ of the area of the container unit. For example, if a portion of the male connector is described as "near" the pivot bolt, this portion is within ⅓ of the shank length from the pivot bolt (e.g. the shank is the container unit that touches both "near" structures).

As used herein, "about" means within plus or minus one at the last reported digit. For example, about 1.00 means 1.00±0.01 unit. In fractions, about 1¹⁄₁₆ units means from 1⁰⁄₁₆ units to 1²⁄₁₆ units. In percentages, about 11% means 10% to 12%.

"Substantially," as used herein with reference to a shape, means within manufacturing tolerance of manufacturing the referenced shape as well as any other shape falling within the doctrine of equivalents for the referenced shape.

Any directional words, such as "top," "bottom," "up," "down," etc. used herein refer to the direction depicted in the figure described. If the described device is rotated, these directions remain indicative of the position described relative to the figure.

"Connected to," as used herein, means a direct physical connection between structures without intervening structures.

"Connected with," as used herein, means a physical connection between structures, with or without intervening structures.

FIG. 1 depicts a diagram of an animal feeder 100 in accordance with the principles of the present invention. The animal feeder 100 may comprise a feeder bowl, such as food bowl 110. Furthermore, the animal feeder 100 may allow for adjustment of the height of the feeder bowl 110 along frame 102.

The frame 102 may comprise any material suitable to support the weight of the feeder bowl 110, food and/or water, and the force of a feeding show animal. For example, show animals may lean on or push against the feeder bowl 110 (referred to as "feeding stress"). Example materials include resilient metals, woods, plastics, rubbers, polycarbonates, etc. The frame 102 may comprise a length and a width disposed in a plane. By way of example, the frame 102 may be 91 cm (3 feet) tall. The frame 102 may be 38 cm (15 inches) wide. The width may be sufficient to support the feeder bowl 110. The length may be sufficient to allow for height adjustment during the raising of the show animals. Example heights may include an exterior bottom of the feeder bowl 110 being set to about 2.5 cm (1 inch) to about 61 cm (24 inches) from the floor when the frame 102 is installed to an emplacement. In some embodiments, the width and height may be sufficient for attaching the frame 102 to an existing fence, gate, or other exterior support. The frame 102 may establish a perimeter that structurally supports the animal feeder 110.

First frame rail 106a and second frame rail 106b may be positioned within a major plane of the frame 102, and may span the length of the frame 102. Frame rails 106a and 106b may be coplanar with the frame 102. Furthermore, guide rail 104 may be disposed between frame rails 106a and 106b, and may span the length of the frame 102. Guide rail 104 may be positioned within the major plane of the frame 102. Frame rails 106a and 106b and guide rail 104 may comprise materials similar to the frame 102. The guide rail 104 may be substantially parallel to the frame rails 106a and 106b, in some embodiments.

Furthermore, the feeder bowl 110 may comprise materials of sufficient strength to retain structural integrity under feeding stress. Example materials include metals, durable plastics, rubber, etc. In some embodiments, the feeder bowl 110 may comprise a food bowl, such as food bowl 112. The food bowl 112 may comprise a bowl or trough shaped to retain solid and/or liquid animal feed.

The feeder bowl 110 may be connected with the guide rail 104 such that the height of the feeder bowl 110 may be adjusted. In some embodiments, the feeder bowl 110 may be connected to feeder coupling 108. In embodiments comprising the food bowl 112, the food bowl 112 may be connected to a food bowl coupling 109.

Figure 2:
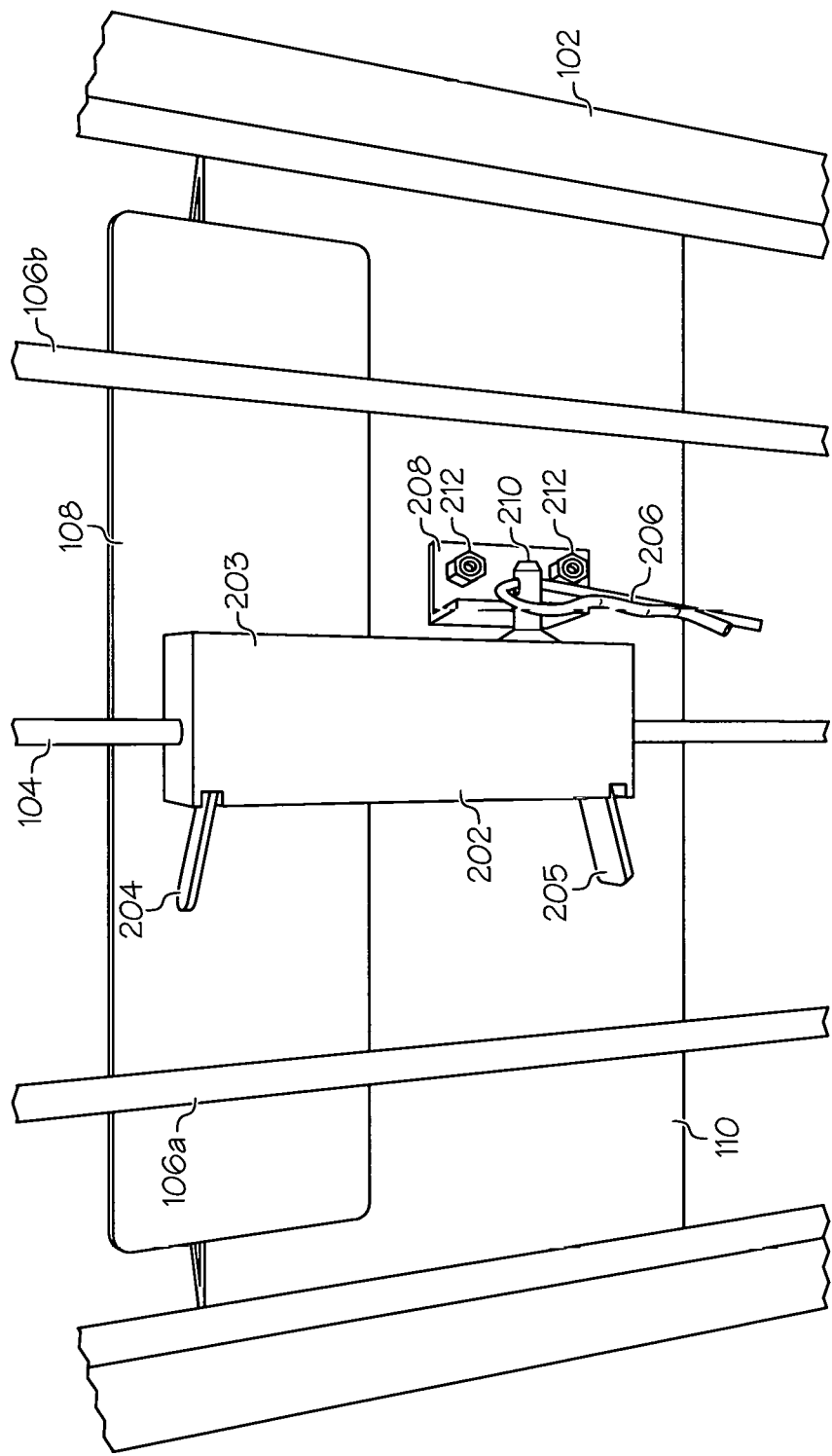
FIG. 2 depicts a diagram of a height adjuster of the animal feeder of FIG. 1 in accordance with the principles of the present invention.

FIG. 2 depicts a diagram of a height adjuster 202 of the animal feeder 100 of FIG. 1 in accordance with the principles of the present invention. Height adjuster 202 may comprise a housing 203, which the guide rail 104 may pass through lengthwise. The height adjuster 202 may comprise a first lever 204. In some embodiments, the height adjuster 202 may comprise a second lever 205. The housing 203 may be connected with, connected to, and/or integrally formed with a cotter pin bolt 210. The cotter pin bolt 210 may extend orthogonally from a face of the housing 203. The cotter pin bolt 210 may be shaped to engage with a bracket 208. Feeder bowl 110 may be connected with, connected to, and/or integrally formed with bracket 208. For example, bracket 208 may be connected to feeder bowl 110 by one or more bolts 212a. In some embodiments, when bracket 208 is engaged with cotter pin bolt 210, the feeder bowl 110 may be suspended at a height corresponding to the height of the housing 203 along guide rail 104.

Figure 3:
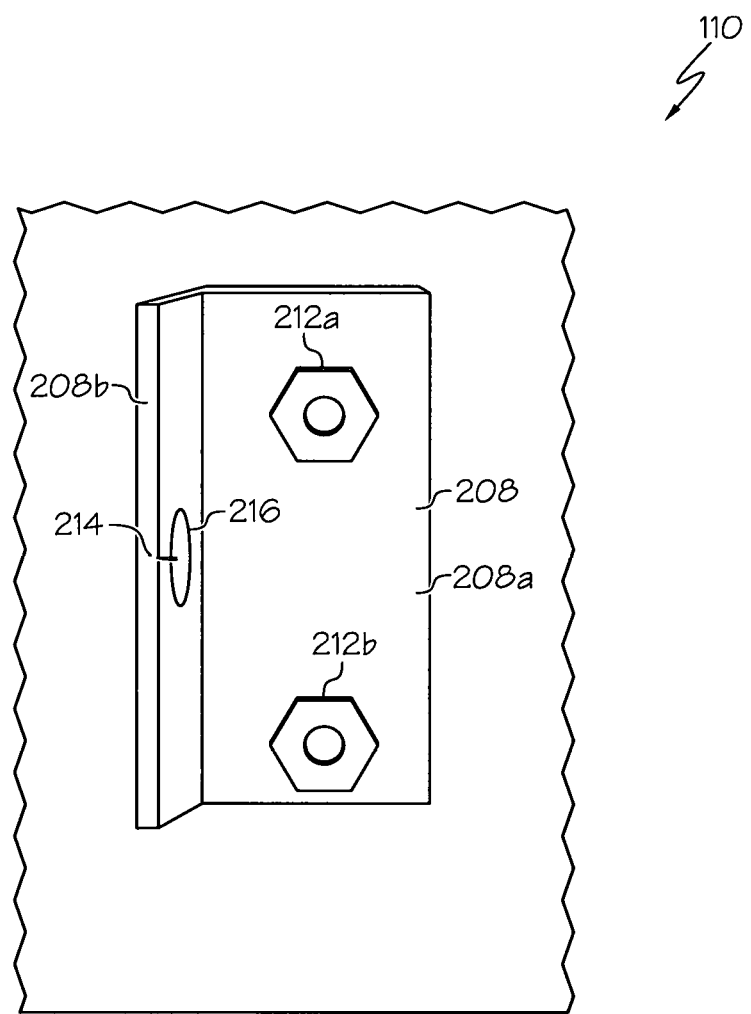
FIG. 3 depicts a diagram of a bracket of the animal feeder of FIG. 1 in accordance with the principles of the present invention.

FIG. 3 depicts a diagram of a bracket 208 of the animal feeder of FIG. 1 in accordance with the principles of the present invention. The bracket 208 may be connected to the feeder bowl 210 by bolts 212a and 212b extending orthogonally through a first side 208a of the bracket 208 and a side of the feeder bowl 110. A second side 208b of the bracket 208 may extend orthogonally from the first side 208a. The second side 208b may comprise a bolt hole 214. The bolt hole 214 may be integrally formed from second side 208b such that bolt hole perimeter face 216 may bound the bolt hole 214. The bolt hole 214 may be sized to receive cotter pin bolt 210, such that bracket 208 may support the weight of the feeder bowl 210. In this manner, the bracket 208 may comprise any material suitable for this function.

Figure 4:
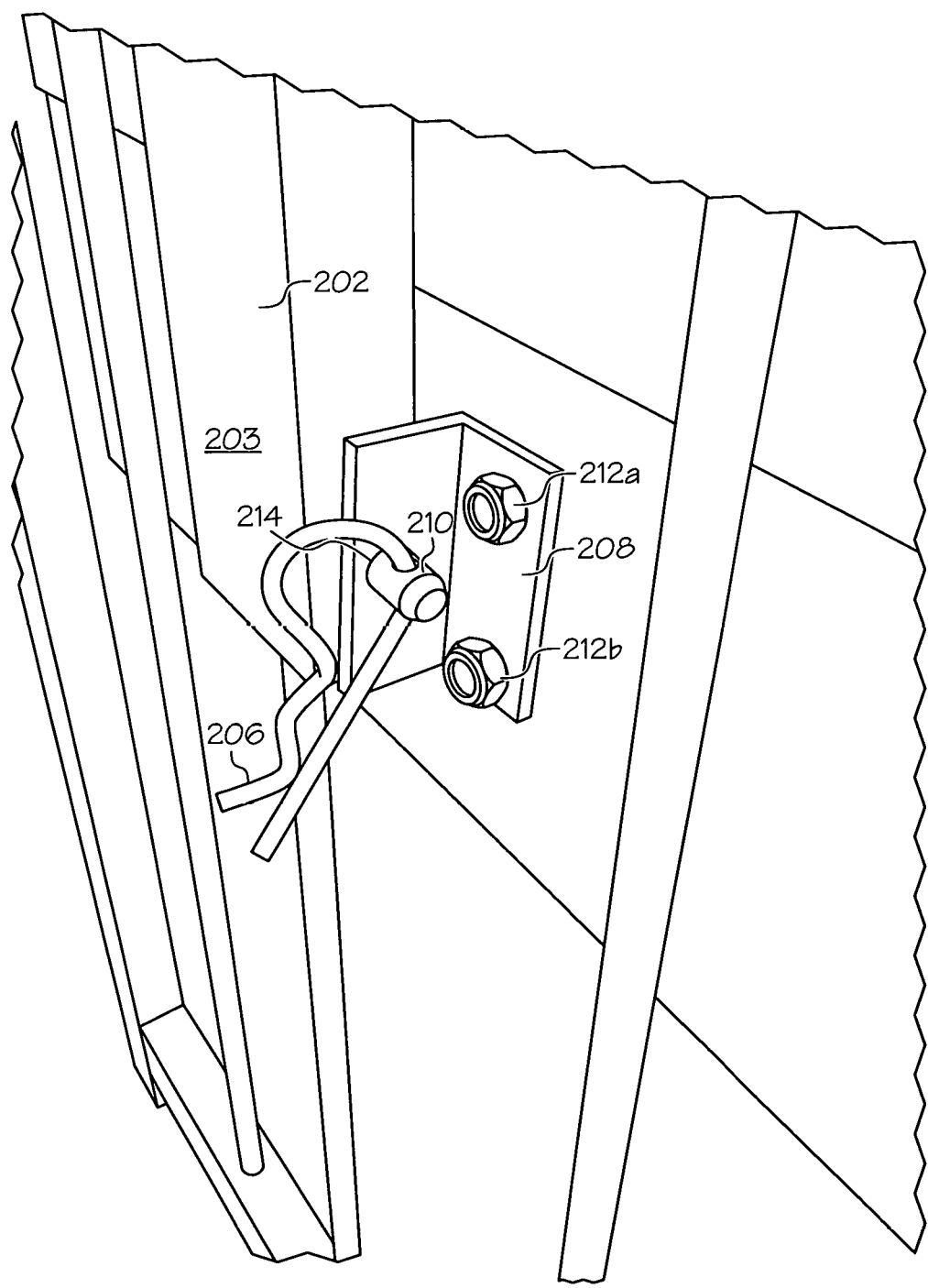
FIG. 4 depicts a different view of the bracket of FIG. 3 in accordance with the principles of the present invention.

FIG. 4 depicts a different view of the bracket of FIG. 3 in accordance with the principles of the present invention. The bracket 208 may be connected to the feeder bowl 110. The bracket 208 may further be connected with housing 203 of the height adjuster 202 by engagement of the cotter pin bolt 210 through the bolt hole 214. This engagement may be further secured by positioning cotter pin 206 through the cotter pin bolt 210.

Figure 5:
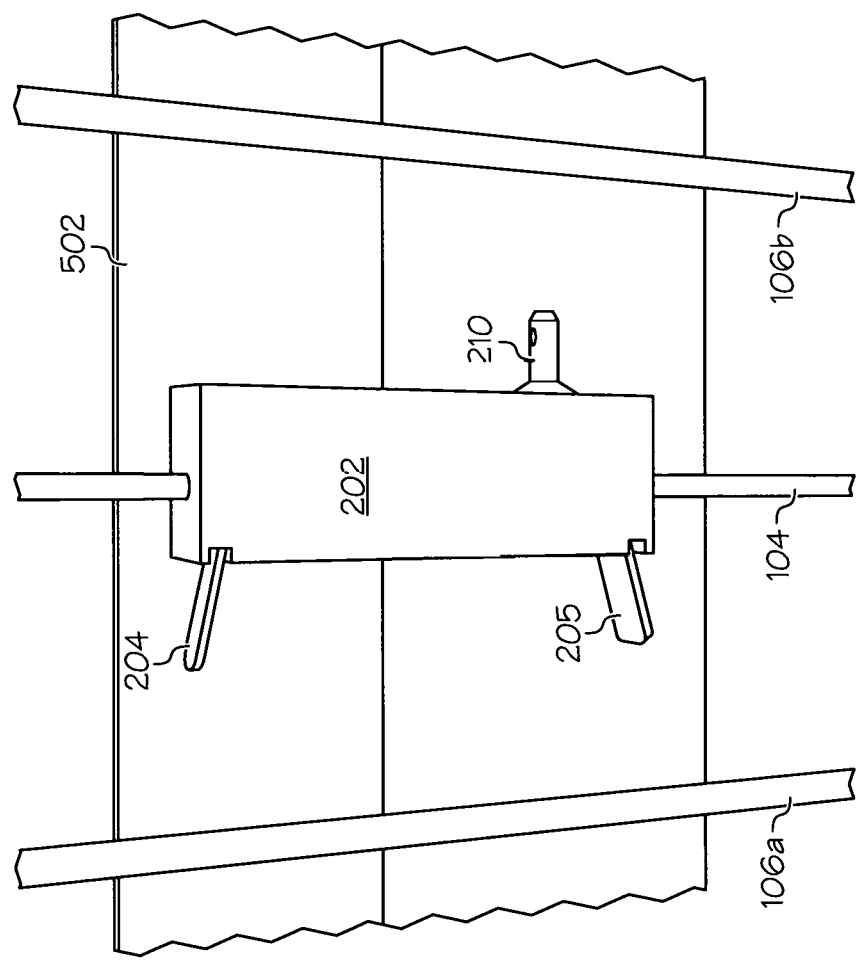
FIG. 5 depicts another view of the height adjuster of FIG. 2 in accordance with the principles of the present invention.

FIG. 5 depicts another view of the height adjuster 202 of FIG. 2 in accordance with the principles of the present invention. By way of example, the housing 203 may be connected with, connected to, and/or integrally formed with a base 502. The base 502 may comprise a length and width. In some embodiments, the base 502 may have sufficient length to prevent rotation of the height adjuster 202 about guide rail 104. In these embodiments, the base 502 may contact frame rails 106a and/or 106b, if rotation starts. The base 502 may comprise materials sufficient to prevent rotation and may be sufficient to support part or all the weight of the feeder bowl 110. Example materials include materials similar to that of the cotter pin bolt 210.

Figure 6:
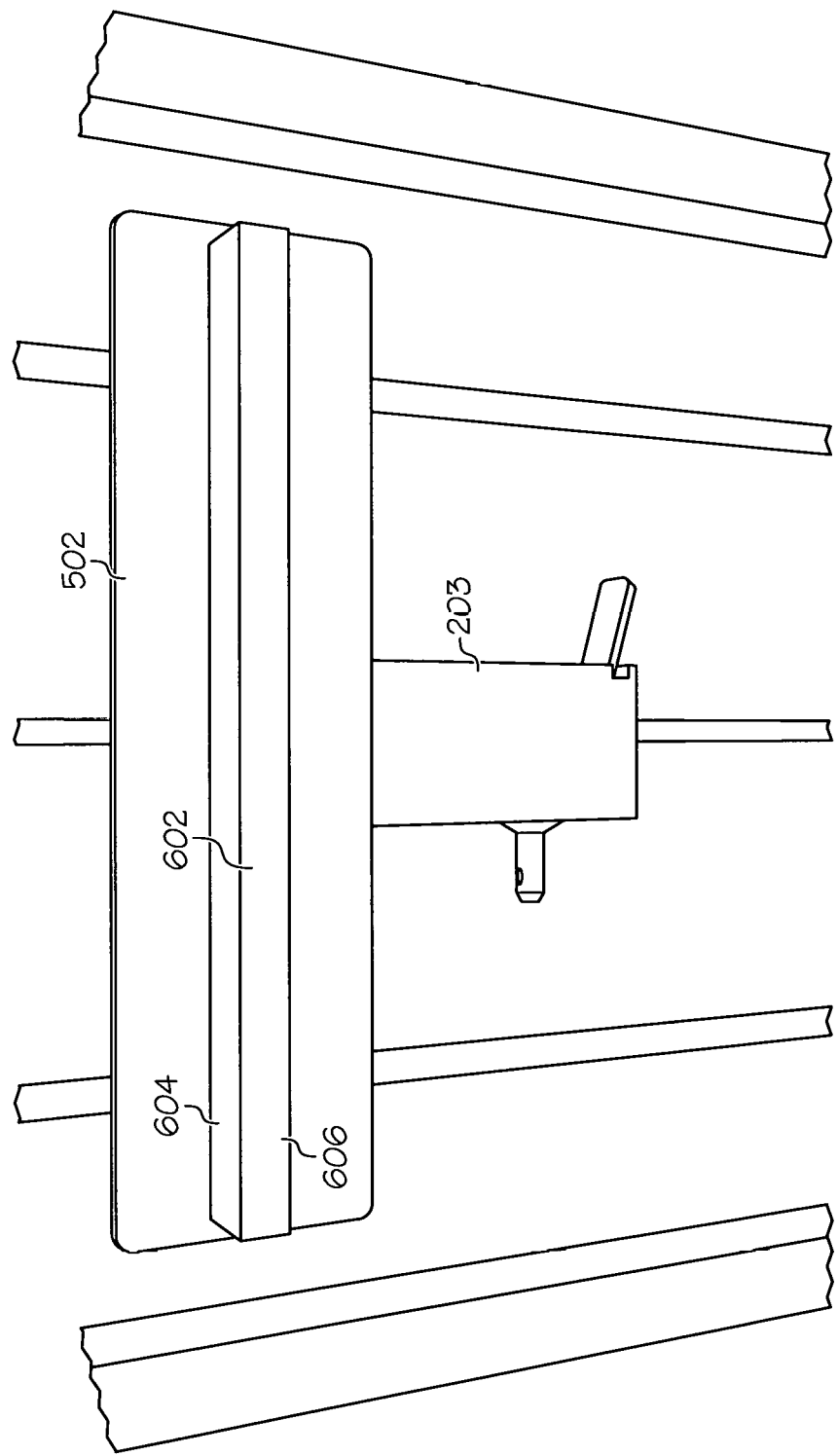
FIG. 6 depicts a feeder coupling of the animal feeder of FIG. 1 in accordance with the principles of the present invention.

FIG. 6 depicts a feeder coupling 602 of the animal feeder 100 of FIG. 1 in accordance with the principles of the present invention. The base 502 may support the feeder coupling 602, which may support the connection of the feeder bowl 110 with the height adjuster 202. For example, the feeder coupling 602 may comprise a feeder coupling body 604 and a feeder coupling lip 606. The materials of the feeder coupling 602 may comprise materials similar to that of the base 502. The feeder coupling 602 may be connected to, connected with, and/or integrally formed with the base 502. In some embodiments, the feeder coupling body 604 may extend orthogonally from the base 502. Furthermore, the feeder coupling lip 606 may extend orthogonally from the feeder coupling body 604. In this manner, some embodiments allow for placement of a portion of a side of the feeder bowl 110 to be wedged between the base 502 and the feeder coupling 602 such that the feeder bowl 110 may be retained in an upright position. For example, the feeder coupling 602 may prevent rotation about cotter pin bolt 210. Thus, feeder coupling 602 and cotter pin bolt 210 may support the connection of the feeder bowl 210 with the height adjuster 202.

Figure 7:
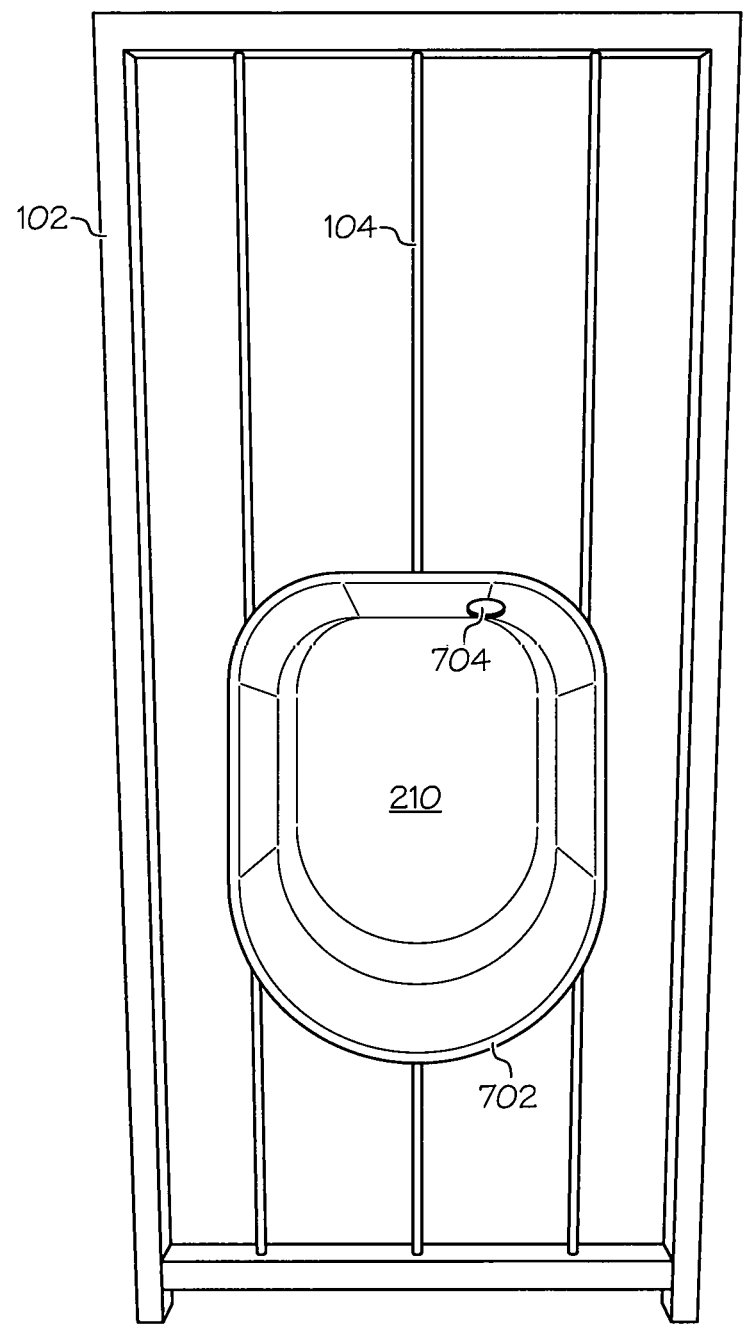
FIG. 7 depicts an animal feeder comprising an alternate feeder bowl comprising a water bowl in accordance with the principles of the present invention.

FIG. 7 depicts an animal feeder 100 comprising an alternate feeder bowl 110 comprising a water bowl 702 in accordance with the principles of the present invention. Embodiments comprising the water bowl 702 may be substantially similar to embodiments described with respect to FIGS. 1-6. Water bowl 702 may be shaped to retain water in the bottom of the water bowl 702 such that a show animal may access the water. In some embodiments, the water bowl 702 may comprise in inlet hole 704. Inlet hole 704 may be configured to receive water and/or a water source, such as a hose, such that water enters water bowl 702 for retention.

Figure 8:
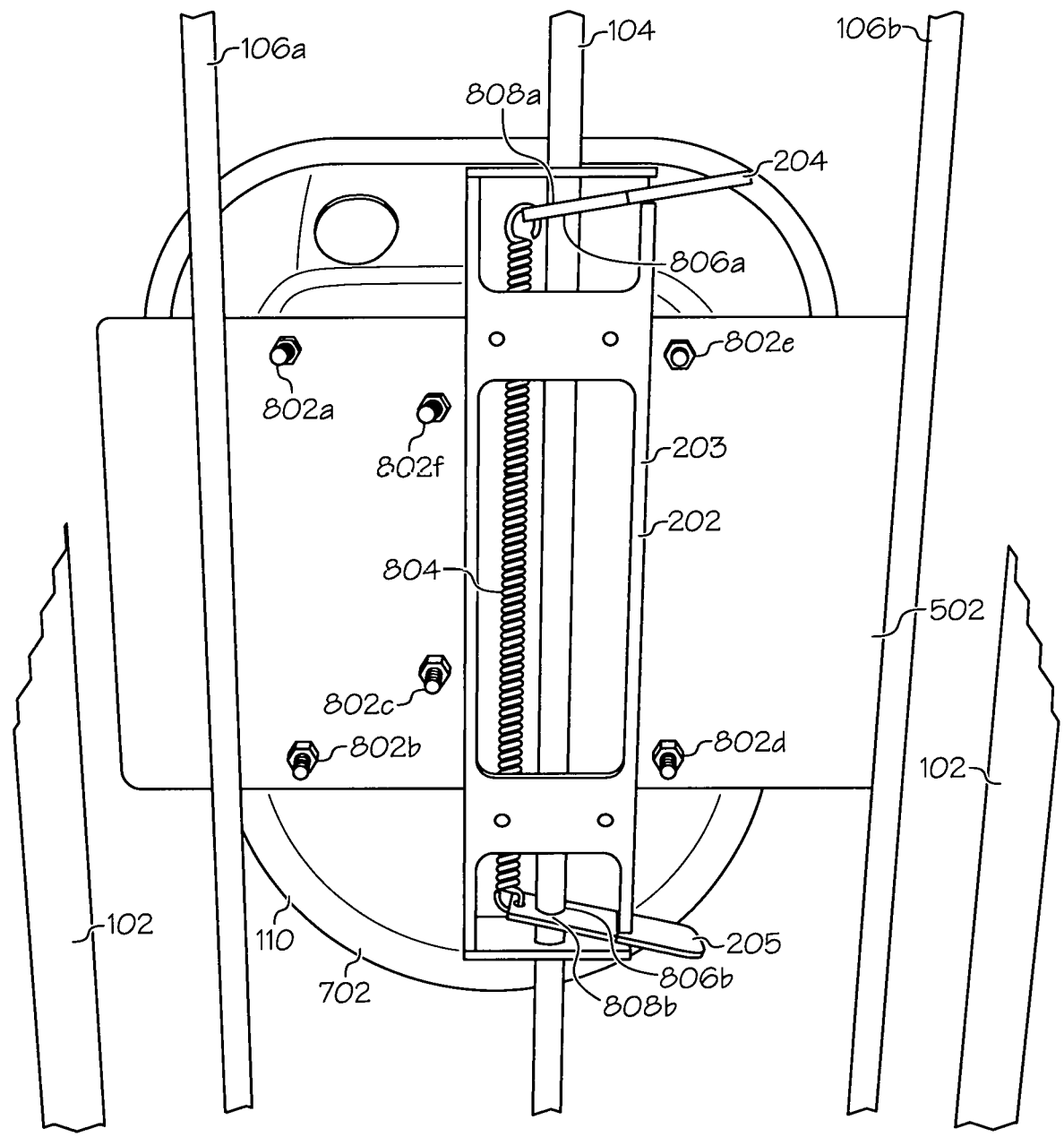
FIG. 8 depicts the animal feeder of FIG. 7 in accordance with the principles of the present invention.

FIG. 8 depicts the animal feeder 100 of FIG. 7 in accordance with the principles of the present invention. In some embodiments, the feeder bowl 110, such as water bowl 702, may be connected to the base 502, such as by one or more bolts 802a-802f. The bolts 802a-802f may extend through the feeder bowl 110 and the base 502. In this manner, the height of the feeder bowl 110 may correspond to the height of the height adjuster 202 along the guide rail 104.

FIG. 8 also depicts a mechanism of the height adjuster 202. By way of example, the height adjuster 202 may comprise two spring-biased levers, wherein the spring holds the height through tension-induced friction. The height adjuster 202 may comprise a housing pivotally engaged with a first lever 204 and/or a second lever 205. The first lever 204 may comprise a first lever body comprising a first rod hole 806a comprising a first hole perimeter face 808a pivotally engaged with the guide rail 104. The guide rail 104 may extend through the first rod hole 806a such that the first lever 204 may pivot along the height of the guide rail 204. The first hole perimeter face 808a may frictionally engage the guide rail 104 when biased by a spring 804. This engagement may resist lowering of the height adjuster 202 along the guide rail 104. In some embodiments, this engagement may resist change in height of the height adjuster 202 along the guide rail in either direction. In some embodiments, pivoting the first lever 204 down may release the frictional engagement of first hole perimeter face 808a such that the height adjuster 202 may be moved down the guide rail 104.

The height adjuster may further comprise the second lever 205 comprising a second lever body comprising a second rod hole 806b comprising a second hole perimeter face 808b pivotally engaged with the guide rail 104. The guide rail 104 may extend through the second rod hole 806b. The second lever 806b may comprise the second lever body comprising a second rod hole 806b comprising a second hole perimeter face 808b. The second lever 205 may pivot along the height of the guide rail 104. In some embodiments, the spring 804 may bias the second lever 205 such that the second hole perimeter face 808b may frictionally engage the guide rail 204. This engagement may resist raising of the height adjuster 202 along the guide rail 104. In some embodiments, this engagement may resist change in height of the height adjuster 202 along the guide rail 104 in any direction. In some embodiments, pivoting the second lever 205 up may release the frictional engagement of second hole perimeter face 808b such that the height adjuster 202 may be moved down the guide rail 104.

The height adjuster 202 may further comprise the spring 804 connected with the first lever 204 and the second lever 205. This connection may bias the first lever 204 upward against the guide rail 104. This connection may further bias the second lever 205 downward against the guard rail 104.

Alternative embodiments of the height adjuster 202 include the first lever 204 connected to a first spring (not depicted) that is connected to a first fixed point of the height adjuster 202, such as on the housing 203. In these embodiments, the second lever 205 may be connected to a second spring (not depicted) that is connected to a second fixed point of the height adjuster 202.

Figure 9:
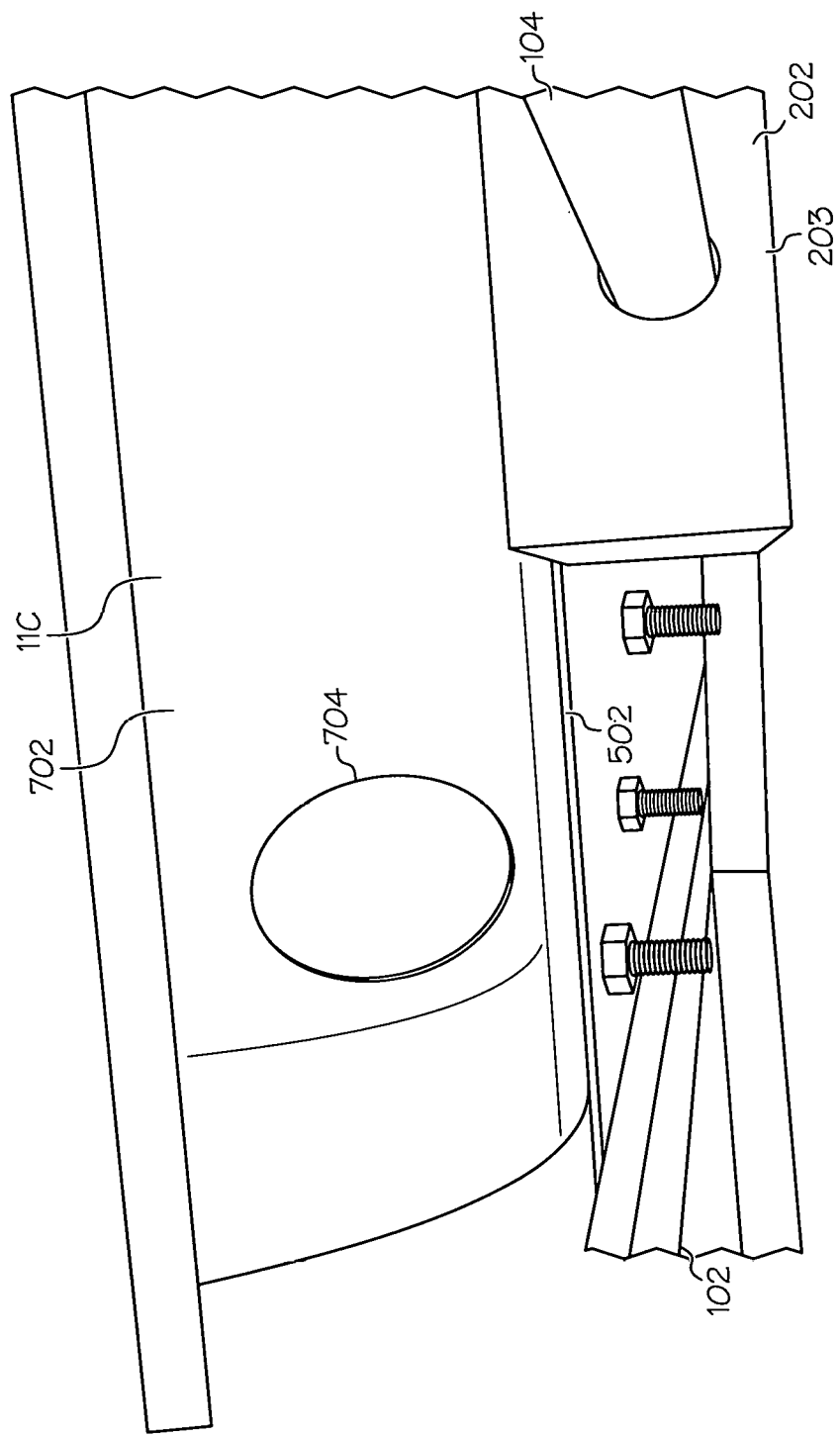
FIG. 9 presents a top-down view of the animal feeder of FIG. 1 in accordance with the principles of the present invention.
Figure 1C:
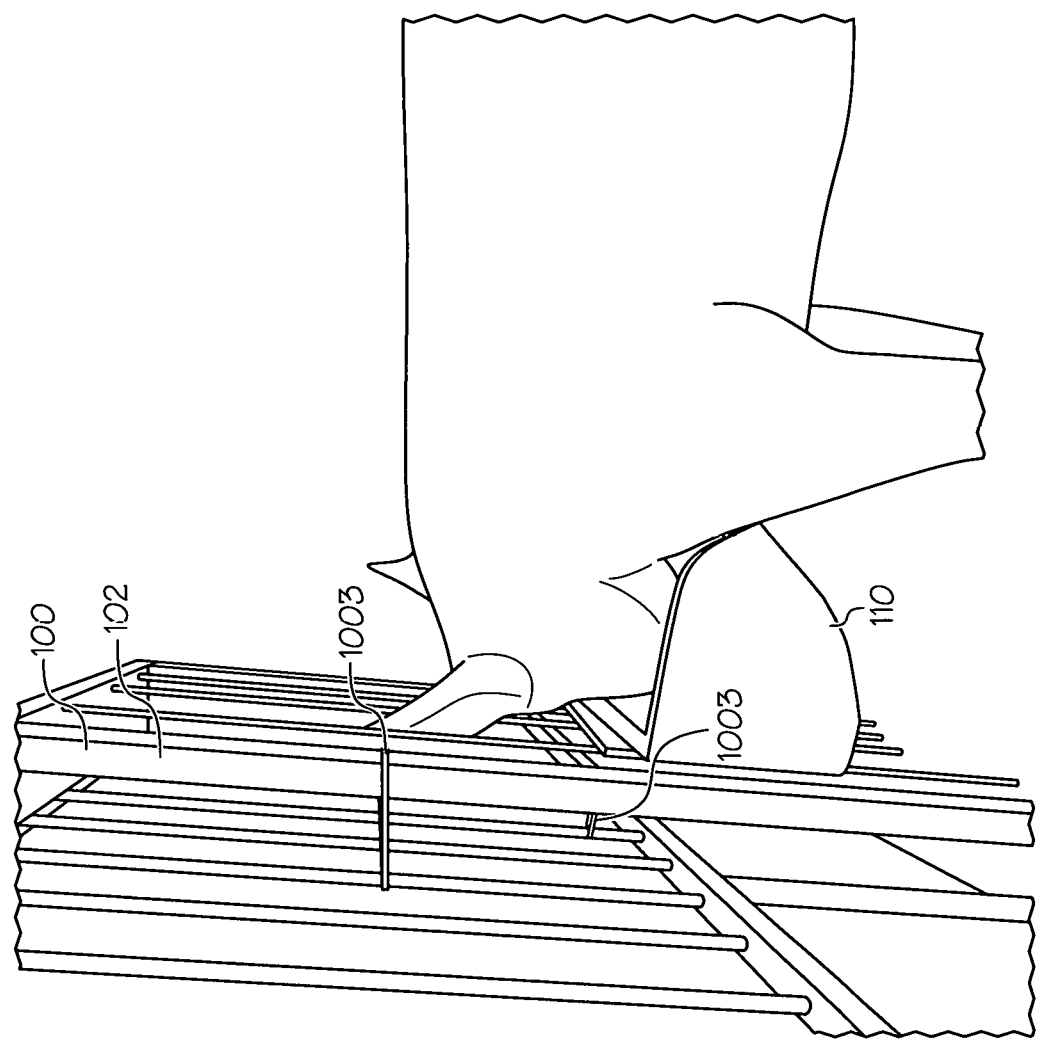

FIG. 9 presents a top-down view of the animal feeder 100 of FIG. 1 in accordance with the principles of the present invention.

FIG. 10a depicts a side view of the animal feeder 100 attached to an emplacement and the feeder bowl 110 adjusted to an appropriate height for a feeding animal in accordance with the principles of the present invention. For example, the emplacement can include a fence, a gate, a stall, a wall, or any similar support structure. By way of example, the frame 102 may be connected with the emplacement by connection to one or more attachments 1003. The one or more attachments 1003 may include any structure of sufficient strength to hold the weight of the animal feeder 100 and force of the feeding animal to the emplacement. Examples include zip ties, metal wires, bolts, screws, welding, etc.

The height adjuster 202 may be set such that the feeder bowl 110 is at an appropriate height. The appropriate height may allow for the feeding animal, show animal, and/or pig to keep a neutral spine position. For example, the height may not necessarily cause the spine to tuck or tilt during feeding. In some embodiments, a level spine from the base of the skull to the base of the tail may be ideal. In this manner, the animal's back and rear muscles may be kept long and lean rather than bunched. Furthermore, feeding at the appropriate height encourages the animal to keep a high-headed posture, which may be desirable in show animals.

Figure 10B:
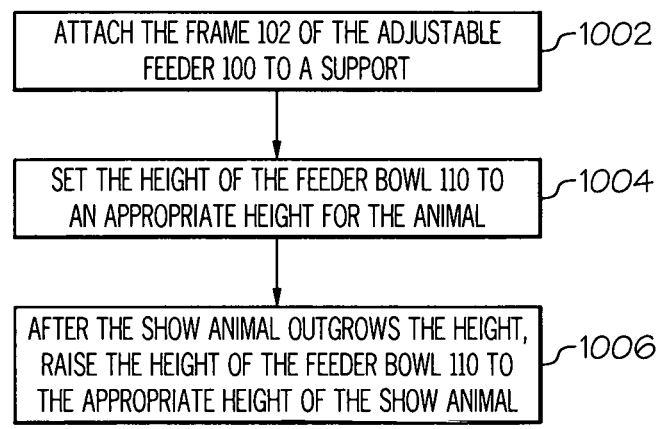
FIG. 10b presents a method of use of the animal feeder of FIG. 1 in accordance with the principles of the present invention.

FIG. 10b presents a method of use of the animal feeder 100 of FIG. 1 in accordance with the principles of the present invention. For example, step 1002 may include attaching the frame 102 to an emplacement such that the adjustable feeder 100 may be supported allowing for a range of appropriate heights.

In step 1004, the feeder bowl 110 may be raised to an appropriate height set by operation of the height adjuster 202, as described herein. For example, the appropriate height may depend on the height of the animal. It may be desirable for a show animal to maintain lean muscle and/or a high head posture. In embodiments regarding show animals, the appropriate height may allow the show animal to reach the food and/or water in the feeder bowl 110 with a neutral and/or high head position. In this manner, lean muscle and/or good posture may be trained in the show animal.

However, the animal may grow taller in some embodiments. When the animal outgrows the current height of the feeder bowl 110, the show animal may drop the head and/or tuck the spine. In step 1006, the height of the feeder bowl 110 may be adjusted to a new appropriate height regarding the animal. The new height may allow the animal to feed with a high head and/or neutral spine once again.

Figure 11:
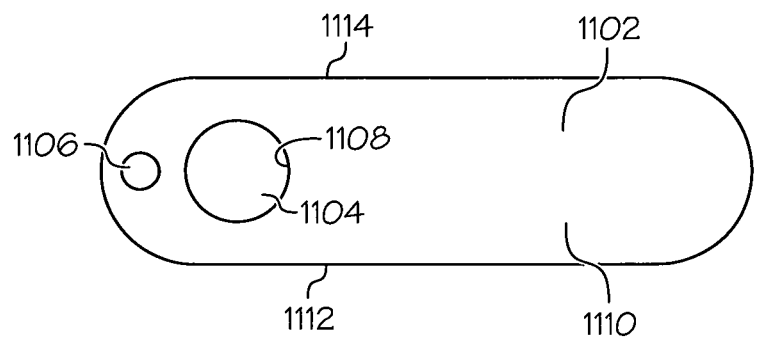
FIG. 11 depicts a lever of a height adjuster in accordance with the principles of the present invention.

FIG. 11 depicts a lever 1102 of the height adjuster 202 in accordance with the principles of the present invention. The lever 1102 may be similar in all respects to first lever 204 and/or second lever 205, and vice versa. For example, the lever 1102 may comprise a guide rail receiver 1104 and/or a spring receiver 1106. The guide rail receiver 1104 may be positioned proximal the spring receiver 1106. The spring receiver 1106 may be positioned at an end of the lever 1102. The guide rail receiver 1104 may comprise a circular transverse hole through the lever 1102. The axis of the guide rail receiver 1104 may be substantial orthogonal to a plane of the lever 1102. Thus, the guide rail receiver 1104 hole may be formed by a cylindrical guide rail hole perimeter face 1108 that extends from a first side 1110 to a second side 1112 of the lever 1102.

A diameter of the guide rail receiver 1104 may be large enough that lever 1102 may be freely moveable along guide rail 104 when the guide rail receiver 1104 is aligned with the guide rail 104. The diameter of the guide rail receiver 1104 may also be small enough that guide rail hole perimeter face 1108 may frictionally brake against guide rail 104 when the lever 1102 is not aligned with the guide rail 104. In this manner, an edge of the guide rail hole perimeter face 1108 at the first side 1110 of the lever 1102 may press against guide rail 104 while an opposite edge of the guide rail hole perimeter face 1108 at a second side 1112 of the lever 1102 may press against the guide rail 104.

In some embodiments, an outer edge 1114 of the lever 1102 may frictionally interact with an inner surface of the housing 203 to aid in restricting pivoting of the lever 1102 to two dimensions. In this manner, a frictional pivot of the lever 1102 may be established between the inner surface of the housing 203 and the guide rail 104.

The lever 1102 may comprise the spring receiver 1106. The spring receiver 1106 may comprise transverse hole through the plane of the lever 1102. The spring receiver 1106 may be positioned at an end of the lever 1102. The spring receiver 1106 may be configured to receive an end of a spring, such as spring 804.

Figure 12:
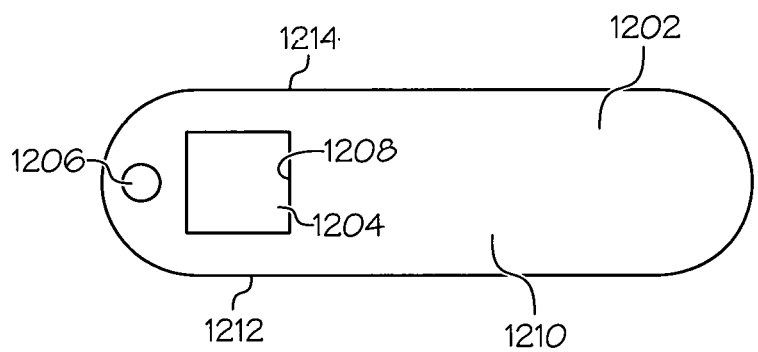
FIG. 12 depicts an alternative height adjuster in accordance with the principles of the present invention.

FIG. 12 depicts an alternative lever 1202 of the height adjuster 202 in accordance with the principles of the present invention. In some embodiments, guide rail 104 may comprise a square cross section, rather than a circular cross section. The square guide rail and square guide rail receiver 1204 may allow in restricting pivoting of the lever to two dimensions.

The lever 1202 may be similar in all respects to first lever 204 and/or second lever 205, and vice versa. For example, the lever 1202 may comprise a guide rail receiver 1204 and/or a spring receiver 1206. The guide rail receiver 1204 may be positioned proximal the spring receiver 1206. The spring receiver 1206 may be positioned at an end of the lever 1202. The guide rail receiver 1204 may comprise a circular transverse hole through the lever 1202. The axis of the guide rail receiver 1204 may be substantial orthogonal to a plane of the lever 1202. Thus, the guide rail receiver 1204 hole may be formed by a cylindrical guide rail hole perimeter face 1208 that extends from a first side 1210 to a second side 1212 of the lever 1202.

A diameter of the guide rail receiver 1204 may be large enough that lever 1202 may be freely moveable along guide rail 104 when the guide rail receiver 1204 is aligned with the guide rail 104. The diameter of the guide rail receiver 1204 may also be small enough that guide rail hole perimeter face 1208 may frictionally brake against guide rail 104 when the lever 1202 is not aligned with the guide rail 104. In this manner, an edge of the guide rail hole perimeter face 1208 at the first side 1210 of the lever 1202 may press against guide rail 104 while an opposite edge of the guide rail hole perimeter face 1208 at a second side 1212 of the lever 1202 may press against the guide rail 104.

In some embodiments, an outer edge 1214 of the lever 1202 may frictionally interact with an inner surface of the housing 203 to aid in restricting pivoting of the lever 1202 to two dimensions.

The lever 1202 may comprise the spring receiver 1206. The spring receiver 1206 may comprise transverse hole through the plane of the lever 1202. The spring receiver 1206 may be positioned at an end of the lever 1202. The spring receiver 1206 may be configured to receive an end of a spring, such as spring 804.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A height adjustability mechanism, comprising:
a spring-biased first lever comprising a first lever body comprising a first rod hole comprising a first hole perimeter face pivotally engaged with a guide rail extending through the first rod hole;
a spring-biased second lever comprising a second lever body comprising a second rod hole comprising a second hole perimeter face pivotally engaged with the guide rail extending through the second rod hole;
wherein the spring bias of the first lever frictionally engages the first hole perimeter face against the guide rail; and
wherein the spring bias of the second lever frictionally engages the second hole perimeter face against the guide rail;
a first frame rail substantially parallel to the guide rail;
a second frame rail substantially parallel to the guide rail, wherein the guide rail, the first frame rail, and the second frame rail are laterally planar with respect to one another;
a housing pivotally engaged with the first lever and the second lever; and
a base plate connected with the housing, the base plate being configured to extend beyond the first frame rail and the second frame rail such that the base plate is prevented from pivoting about the guide rail.

2. The height adjustability mechanism of claim 1, wherein the spring bias of the first lever reduces sliding of the housing down the guide rail.

3. The height adjustability mechanism of claim 1, wherein the spring bias of the second lever reduces sliding of the housing up the guide rail.

4. The height adjustability mechanism of claim 2, wherein levering the first lever reduces friction between the first hole perimeter face and the guide rail.

5. The height adjustability mechanism of claim 3, wherein levering the second lever reduces friction between the second hole perimeter face and the guide rail.

6. The height adjustability mechanism of claim 4, wherein levering the first lever further allows the housing to slide down the guide rail.

7. The height adjustability mechanism of claim 5, wherein levering the second lever further allows the housing to slide up the guide rail.

8. The height adjustability mechanism of claim 1, wherein the first rod hole comprises a substantially circular cross section.

9. The height adjustability mechanism of claim 1, wherein the first rod hole comprises a substantially square cross section.

10. The height adjustability mechanism of claim 1, further comprising a base plate connected with the housing.

* * * * *